United States Patent [19]

Hamilton

[11] 4,387,561

[45] Jun. 14, 1983

[54] UTILIZATION OF COAL POWERING A GAS TURBINE ENGINE

[75] Inventor: Stuart Hamilton, Glastonbury, Conn.

[73] Assignee: United Technologies Corporation, Hartford, Conn.

[21] Appl. No.: 220,542

[22] Filed: Dec. 29, 1980

[51] Int. Cl.³ .............................. F02C 3/28; F02C 6/18
[52] U.S. Cl. .................................. 60/39.02; 60/39.12; 60/39.511
[58] Field of Search ............. 60/39.02, 39.12, 39.18 B, 60/39.46 S, 39.51 R

[56] References Cited

U.S. PATENT DOCUMENTS 3,446,014  5/1969  Foster-Pegg ...................... 60/39.02
3,847,563  11/1974  Archer et al. ............................ 48/77
3,978,657  9/1976  Fulton et al. ...................... 60/39.12
4,253,300  3/1981  Willyoung ...................... 60/39.46 S Primary Examiner—Louis J. Casaregola
Attorney, Agent, or Firm—Gene D. Fleischhauer

[57] ABSTRACT

An apparatus 10 for consuming coal in powering a gas turbine engine 12 is disclosed. The apparatus includes an auxiliary combustor 16 and a partial gasifier 18. The gasifier 18 produces combustible char and combustible fluids. The combustible fluids are burned in the gas turbine engine. The combustible char is burned in the auxiliary combustor to form high temperature gases. Heat is transferred from the high temperature gases to the working medium flow path of the gas turbine engine. The exhaust from the gas turbine engine provides combustion air to the fluidized bed combustor.

4 Claims, 3 Drawing Figures

UTILIZATION OF COAL POWERING A GAS TURBINE ENGINE

DESCRIPTION

TECHNICAL FIELD

This invention relates to the combustion of coal and particularly to the use of coal-derived fuels with gas turbine engines.

BACKGROUND ART

Coal is an attractive source of energy because coal reserves are substantially larger than those of oil and natural gas. Traditionally, energy is obtained from the coal by burning the coal directly in a furnace to form high temperature gases. Energy in the form of heat is transferred from the high temperature gases amd may be transformed into work by raising and passing steam through a steam turbine.

In gas turbine engines, hot working medium gases are expanded through a turbine to produce work. One approach to using coal as a source of energy in a gas turbine engine is to first pulverize the coal and to subsequently burn the coal in a combustion chamber of the engine to form the hot working medium gases. Burning coal directly in the engine produces ash and these ash particulates cause damage to the engine as they pass through the engine degrading the service life and the performance of the engine. A second approach to using coal is to first process the coal to obtain combustible gases or liquids. The combustible fluids, either gases or liquids, are cleaned of ash and pollutants and are then burned in the gas turbine engine to produce the hot working medium gases.

Some gasification processes for producing combustible gases also form a carbon rich by-product called char. The char is normally recycled until all of the carbon is gasified. Burning the char directly in the gas turbine engine would improve the gasifier output and cycle efficiency, but, as is the case with pulverized coal, burning the char produces abrasive particulates which may damage the turbine. Accordingly, scientists and engineers are seeking ways to utilize the full heating value of coal without exposing the engine components to abrasive particulates.

DISCLOSURE OF INVENTION

According to the present invention, the heating value of coal is utilized to heat the working medium gases of a gas turbine engine in a two-stage combustion process by burning gases derived from the coal within the engine and by burning the char derived from the coal externally of the engine in an auxiliary combustor.

In accordance with one detailed embodiment, the exhaust gases from the turbine fluidize char and limestone in the auxiliary combustor and supply heat and oxygen to the auxiliary combustor for the burning of the char; a heat exchanger in the auxiliary combustor heats the working medium gases of the gas turbine.

A primary feature of the present invention is an auxiliary combustor. Other features are a gas turbine engine and a coal gasifier. Coal is fed into the gasifier to produce combustible char and combustible volatile gases. The combustible gases and the combustible char derived from the coal in the gasifier are burned respectively in the gas turbine engine and the auxiliary combustor. The combustible char is burned in the auxiliary combustor with the hot exhaust gases from the turbine to preheat the working medium gases upstream of the engine combustion chamber. The working medium gases are flowed from the compressor of the engine through a heat exchanger in the auxiliary combustor and returned to the engine combustion chamber. The auxiliary combustor collaterally supplies heat to the gasifier for high temperature conversion of the coal to combustible gases and char.

A principal advantage of the present invention is the complete utilization of the heating value of the coal in powering a gas turbine engine which results from the on-site combustion of combustible gases and combustible char. The efficiency of the gasifier may be maximized by operating the gasifier at a level of gasification equal to the percentage of volatiles contained in the coal. The efficiency of the gasifier is enhanced by transferring a portion of the heat to the working medium gases from the auxiliary combustor and then recapturing that heat in the auxiliary combustor during combustion of the char. The efficiency of the apparatus is further enhanced by transferring a portion of the heat from the auxiliary combustor to the partial gasifier for conversion of the coal into combustible gases and combustible char. In one embodiment where a fluidized bed is used for the auxiliary combustor, the bed is fluidized by the exhaust gases from the gas turbine engine. In one embodiment, the coal conversion means is enabled to operate at high efficiency and to produce a medium Btu gas having approximately 500 British Thermal Units per cubic foot (500 Btu/ft$^3$).

The foregoing, and other objects, features and advantages of the present invention will become more apparent in the light of the following detailed description of the preferred embodiment thereof as shown in the accompanying drawing.

BEST MODE FOR CARRYING OUT THE INVENTION

Figure 1:
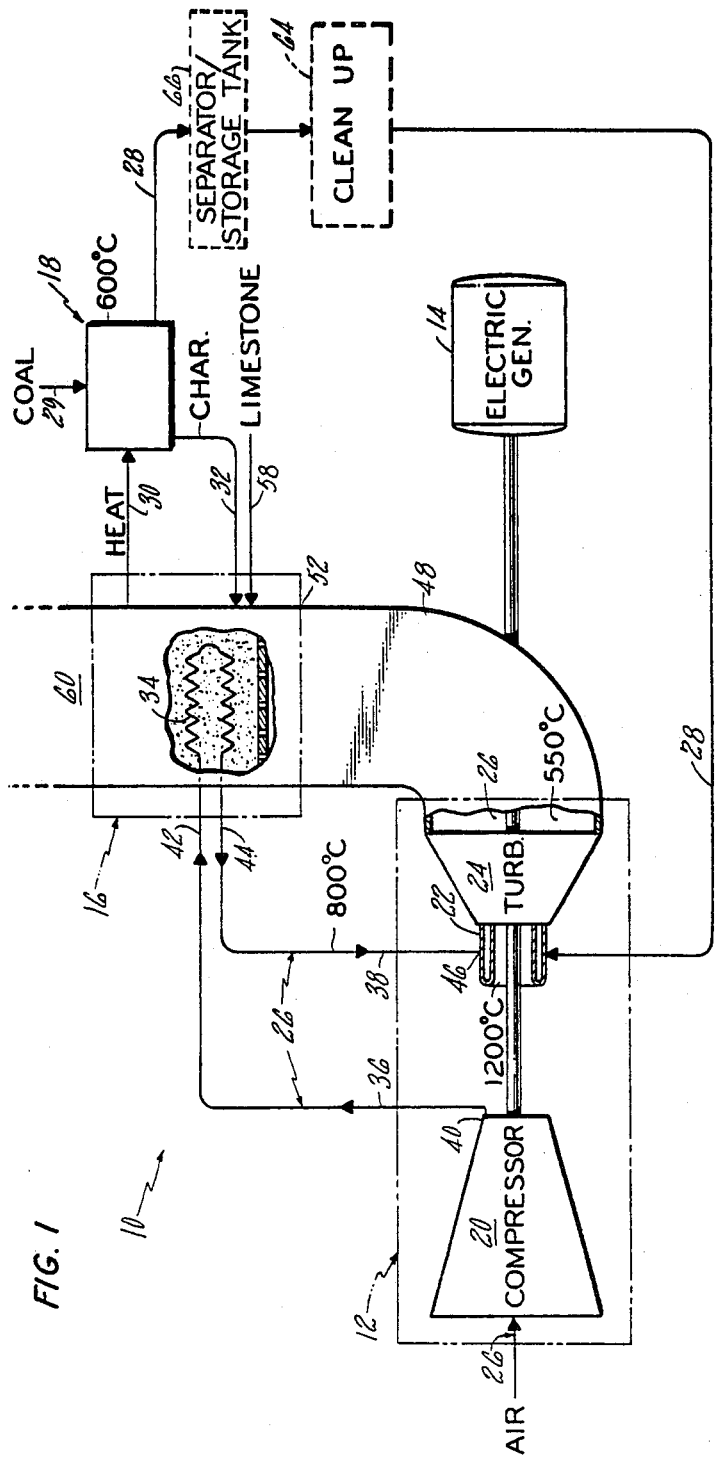
FIG. 1 is a schematic diagram of a coal fired gas turbine engine apparatus.

FIG. 1 is a schematic diagram of a gas turbine engine apparatus 10 employing the combustion of coal in powering the engine. The particular embodiment shown is designed to operate at temperatures which are noted in the schematic although other embodiments of this invention may operate at other temperatures as appropriate. The apparatus includes a gas turbine engine 12. An electrical generator 14 is mechanically coupled to the gas turbine engine. The apparatus further includes an auxiliary combustor such as the fluidized bed combustor 16 and a coal conversion means such as the partial gasifier 18. Each of these devices is well known in the art and each is discussed at length in the publication entitled "Clean Fuels from Coal-Symposium 2" available from the Institute of Gas Technology, Chicago, Ill.

The gas turbine engine 12 includes a compressor section 20, a combustion section such as an annular combustion chamber 22 and a turbine section 24. A working medium flow path 26 extends through these sections. A conduit 28 extending into the annular combustion chamber places the working medium flow path of the engine in fluid communication with the partial gasifier 18. The partial gasifier receives coal from the transfer device 29 and uses heat and partial combustion to extract from the coal combustible fluids for the gas turbine engine and char for the auxiliary combustor. A conduit 30 for transferring heat extends from the auxiliary combustor to the partial gasifier. A transfer device 32 for transferring char extends between the partial gasifier and the auxiliary combustor 16.

A heat exchanger 34 is disposed in the auxiliary combustor 16. The heat exchanger is in heat transfer communication with the auxiliary combustor. A portion of the working medium flow path 26 of the gas turbine engine extends through the heat exchanger via conduit 36 and a conduit 38. These conduits bound a portion 39 of the working medium flow path 26 of the gas turbine engine. The conduit 36 is in fluid communication with the outlet 40 of the compressor and the inlet 42 of the heat exchanger. The conduit 38 is in fluid communication with the outlet 44 of the heat exchanger and the inlet 46 of the combustion chamber. A conduit 48 extends between the outlet 50 of the gas turbine engine and the inlet 52 of the fluidized bed.

Figure 2:
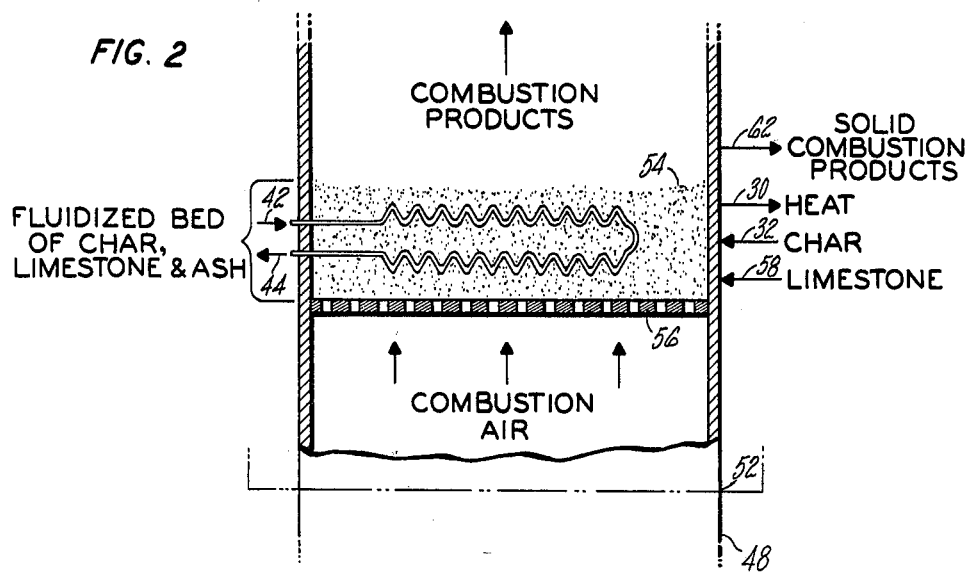
FIG. 2 is a schematic diagram of a fluidized bed combustor.

FIG. 2 is a schematic view of the fluidized bed combustor 16. The bed has a cavity 54. A means for metering flow such as a metering plate 56 is disposed between the inlet 52 and the cavity 54. The cavity receives char from the transfer device 32 and limestone from a transfer device 58. The bed has an outlet 60 for the gaseous products of combustion and a transfer device 62 for removing the non-gaseous products of combustion.

During operation of the coal fired gas turbine apparatus, coal is fed into the partial gasifier 18. The gasifier is operated at a distillation temperature of approximately 600° C. causing the production of a volatile gas having a heating value in excess of five hundred British Thermal Units per standard cubic foot (H.V.>500 Btu/scf). For a typical low volatile sub-bituminous coal, distillation at 600° C. yields the following approximate percentages by weight: char 63%; water 10.3%; dry tar 9.5%; light oil 1.6%; gas 15%; and hydrogen sulfide 0.8%. Char is transferred by the transfer device 32 to the fluidized bed combustor 18 and is burned with oxygen in the exhaust gases from the gas turbine engine 12 to form a high temperature gas. Heat is transferred from the high temperature gas of the fluidized bed via the conduit 30 to the partial gasifier for converting the coal into combustible fluids and a combustible char. The combustible fluids in gaseous form include combustibles ($CH_4$, $CO$ and $H_2$), inerts ($N_2$ and $CO_2$) and pollutants ($H_2S$, $NH_3$, $H_3$, tar and dust). These pollutants may be removed from the gas before the gas is flowed to the combustion chamber 22 of the gas turbine engine. For example, a cleanup system 64 such as a Rectisol® or Purisol® system using a chemical purification process to remove sulfur compounds and particulates might be employed. Tars and light oil may also be removed from the combustible fluids and stored in a separator/storage tank 66 for later consumption in the gas turbine engine or may be used to promote combustion in the auxiliary combustor by being burned with the combustible char. The combustible fluids are flowed through conduit 28 from the partial gasifier to the gas turbine engine 14 to power the engine.

During operation of the gas turbine engine a working medium gas such as air containing oxygen is introduced into the compressor 20. The working medium gas is compressed by the compressor raising the temperature and the pressure of the working medium gas. The working medium gas is flowed from the outlet 40 of the compressor through the conduit 36 to the heat exchanger 34. The working medium gas is introduced into the inlet 42 of the heat exchanger 34 which is disposed in the fluidized bed combustor 16. As the working medium gas is flowed through the heat exchanger the gas receives heat from the heat exchanger increasing the temperature of the gas to a value as high as 800° C. The working medium gas is flowed from the outlet 44 of the heat exchanger via conduit 38. The gas is introduced into the inlet of the combustion chamber 22. Combustible fluids from the partial gasifier 18 are introduced into the combustion chamber via the conduit 28. The combustible fluids are burned with the hot working medium gases to increase the temperature of the working medium gases to above 1200° C. These hot working medium gases are introduced into the turbine 24. The gases are expanded through the turbine doing work on the turbine. The mechanical couplings between the turbine and the compressor and between the turbine and the electrical generator enable the turbine to drive these devices.

The pressurized effluent or exhaust from the turbine is flowed via the conduit 48 to the inlet to the fluidized bed 52. The effluent is introduced into the cavity 54 of the fluidized bed through the metering plate 56. Because the pressurized effluent passes rapidly through the bed, the effluent fluidizes the bed to promote the combustion reaction. This pressurized effluent contains unconsumed oxygen and provides combustion oxygen to the fluidized bed. The combustion oxygen is consumed with the char and limestone by burning to produce high temperature products of combustion such as flue gas and ash. The gaseous combustion products are flowed from the fluidized bed through the outlet 60. The gases are still hot after heating the compressor airflow and may be further utilized to raise steam as in a conventional gas turbine combined cycle. The non-gaseous products of combustion are removed by the transfer device 62.

The present invention is useful for consuming any coal in powering a gas turbine engine. For each particular coal it is desirable to produce combustible fluids and solids in a proportion that maximizes the gasifier efficiency of the partial gasifier. Each gasifier has losses which are generally attributable to pumping and heat losses associated with the volume flow of the fuel gas to the gas turbine engine. The fuel gas volumes required in partial gasification systems are much less than for comparable full gasification systems which suggest that lower losses and higher gasification efficiencies must occur for some operating points as compared to others. One way to quantify the gasifier efficiency is to express as a ratio the quantity of the heating value produced as combustible fluids and combustible char to the quantity of the heating value contained in the coal introduced into the partial gasifier.

Figure 3:
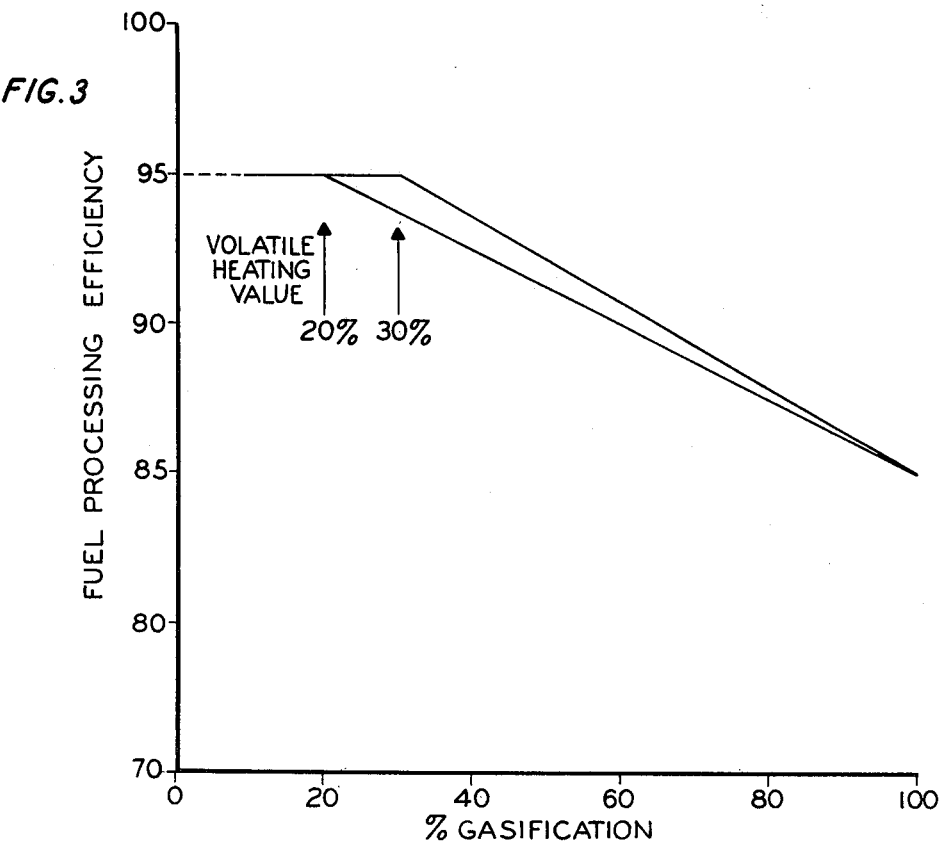
FIG. 3 is a graphical representation of gasifier efficiency versus the percentage of coal which is gasified.

FIG. 3 is a good approximation of the efficiencies associated with operating a gasifier at different percentages of gasification. For example, the gasifier efficiency is approximately 95% during gasification in the absence of uncombined free oxygen. Combustible fluids and combustible char are produced. Assuming the coal contains twenty percent (20%) volatiles (FIG. 7, curve A), the efficiency of the gasifier begins to decrease at twenty percent gasification as oxygen is added to obtain gasification of the remaining coal. The additional gasification causes the volume flow of gas to increase, decreasing the formation of char. As more oxygen is added, the volume of the gas flow increases and the efficiency of the gasifier is reduced until the gasifier reaches full gasification operating at 85% efficiency. At this point, only fluid (gaseous) combustibles are produced. No char is formed and all the heating value is present in the gaseous combustibles.

The inefficiency associated with full gasification resusults from the required use of a cleanup system 64 to meet air pollution standards as well as to avoid the particulate-caused damage to the gas turbine.

The only available cleanup systems are based on chemical processes that work at low temperatures. Cooling the large volume of gases to low temperatures for cleanup may be accomplished by transferring heat into a steam system of a combined cycle. Even then the efficiency of the steam portion of the cycle is less than the combined cycle efficiency causing a decrease in the efficiency of the combined cycle.

The problem is aggravated by using air to supply the oxygen. Dry air by volume percent is approximately 78% nitrogen and only 21% oxygen. Accordingly, the volume flows are increased as inert nitrogen is pumped through the system. If pure oxygen is used instead of air, the heat and pumping losses associated with cleaning the combustible fluids in conduit 28 is reduced, but these losses are more than offset by the work required to produce oxygen.

Thus, for coal having thirty percent (30%) volatiles, the gasifier efficiency will remain high until those volatiles are driven off (FIG. 3, curve B). At that point, increased volume flow caused by the presence of inert gas causes the gasifier efficiency to begin to decrease. Again an efficiency of eighty-five percent (85%) represents the efficiency associated with complete fuel gasification. A review of the literature concerning different gasification cycles indicates that the graphical representation of efficiencies shown in FIG. 3 is conservative for pyrolysis, zero to thirty percent gasification, and optimistic for one hundred percent gasification. Accordingly the curve of FIG. 3 suggests that operating the partial gasifier at the percent of gasification associated with driving off all the volatiles from the coal will produce the highest gasifier efficiency. The consumption of the char in the auxiliary combustor enables the utilization of the heating value of the char in the gas turbine engine and yet isolates the gas turbine engine from harmful particulates associated with burning coal or burning char or full gasification of coal while maintaining acceptable cycle efficiencies.

As will be realized a sacrifice in gasifier efficiency based on the heating value of the products produced may be acceptable where the temperature into the gas turbine is to be increased and the heat exchanger temperature is limited. Under these conditions it is necessary to produce more gas and it is then desirable to produce less char. In such a case, the introduction of air into the gasifier will increase the gas produced in proportion to the char decreased.

Although the invention has been shown and described with respect to preferred embodiments thereof, it should be understood by those skilled in the art that various changes and omissions in the form and detail thereof may be made therein without departing from the spirit and the scope of the invention.

I claim:

1. A method for completely consuming the heating value of coal in powering a gas turbine engine by using an auxiliary combustor wherein the gas turbine engine has a working medium gas and is formed of a compressor, a combustion chamber, and a turbine, comprising:

feeding the coal into a coal conversion means;

converting the coal into combustible fluids and combustible char in the coal conversion means;

burning all of the char from the coal conversion means in an auxiliary combustor to produce a high temperature gas;

transferring heat from the high temperature gas of the auxiliary combustor to the working medium gas to raise the temperature of the working medium gas after the working medium gas passes through the compressor;

transferring heat from the high temperature gas of the auxiliary combustor to the coal conversion means for converting the coal into combustible fluids and combustible char;

burning the combustible fluid with the heated working medium gas in the combustion chamber of the engine to produce a working medium gas having a temperature in excess of twelve-hundred degrees Centigrade (1200° C.);

expanding the working medium gases having a temperature in excess of two thousand degrees Fahrenheit through the turbine to power the gas turbine engine;

exhausting the working medium gas expanded through the turbine into the auxiliary combustor to provide heat and oxygen to the auxiliary combustor wherein the coal is consumed to produce energy and the turbine is isolated by the auxiliary combustor from harmful particulates produced by burning the char.

2. The method for completely consuming the heating value of coal in powering a gas turbine engine of claim 1 including the step of storing a portion of the combustible fluids produced by the coal conversion unit.

3. The method for completely consuming the heating value of coal in powering a gas turbine engine wherein the auxiliary combustor has a means for metering the flow and a combustion bed adapted to be fluidized in fluid communication through the metering means with the exhausted working medium gases of claim 1 including the step of passing the working medium gases expanded through the turbine into the auxiliary combustor through the metering means and the combustion bed to fluidize the combustion bed.

4. The method for completely consuming the heating value of coal in powering a gas turbine engine of claims 1, 2 or 3 wherein the amount of coal converted into combustible fluids is equal to the percentage value by weight of volatiles contained in the coal.

* * * * *